United States Patent
Iwasaki

(10) Patent No.: US 9,531,445 B2
(45) Date of Patent: Dec. 27, 2016

(54) COMMUNICATION APPARATUS, PROGRAM, COMMUNICATION METHOD AND COMMUNICATION SYSTEM

(71) Applicant: Sony Corporation, Tokyo (JP)

(72) Inventor: Jun Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 35 days.

(21) Appl. No.: 14/146,931

(22) Filed: Jan. 3, 2014

(65) Prior Publication Data

US 2014/0120835 A1 May 1, 2014

Related U.S. Application Data

(63) Continuation of application No. 13/733,514, filed on Jan. 3, 2013, now Pat. No. 8,644,761, which is a continuation of application No. 12/479,174, filed on Jun. 5, 2009, now Pat. No. 8,374,544.

(30) Foreign Application Priority Data

Jul. 29, 2008 (JP) ................................ 2008-195228

(51) Int. Cl.
    *H04B 7/00* (2006.01)
    *H04B 5/00* (2006.01)
    *H04B 5/02* (2006.01)
    *H04B 7/24* (2006.01)

(52) U.S. Cl.
    CPC .......... *H04B 5/0075* (2013.01); *H04B 5/0031* (2013.01); *H04B 5/02* (2013.01); *H04B 7/24* (2013.01)

(58) Field of Classification Search
    USPC .... 455/561, 517, 557, 127, 54.2, 31, 38, 70, 455/512, 450, 452.1, 524, 466, 434; 370/442, 445, 448, 330, 328, 338, 346, 370/450, 326, 345
    See application file for complete search history.

(56) References Cited

U.S. PATENT DOCUMENTS

| 5,805,764 A | 9/1998 | Noritomi |
| 6,175,684 B1 | 1/2001 | Noritomi |
| 6,401,243 B1 | 6/2002 | Suzuki |
| 6,986,156 B1 | 1/2006 | Rodriguez et al. |
| 7,934,232 B1 | 4/2011 | Jerding et al. |

(Continued)

FOREIGN PATENT DOCUMENTS

| CN | 1205473 A | 1/1999 |
| JP | 2002-291066 | 10/2002 |

(Continued)

OTHER PUBLICATIONS

Combined Chinese Office Action and Search Report issued Feb. 2, 2015 in Patent Application No. 201310342631.7 (with English language translation).

*Primary Examiner* — Ganiyu A Hanidu
(74) *Attorney, Agent, or Firm* — Oblon, McClelland, Maier & Neustadt, L.L.P.

(57) ABSTRACT

A communication apparatus including a first storage unit, a second storage unit logically or physically discriminated from the first storage unit, a first communication unit, a second communication unit for transmitting data stored in the second storage unit through electric field coupling or magnetic field coupling, and a selecting unit for selecting at least either the first storage unit or the second storage unit as a storage destination of the data received by the first communication unit.

12 Claims, 5 Drawing Sheets

(56) References Cited

U.S. PATENT DOCUMENTS

| | | |
|---|---|---|
| 8,369,777 B2 | 2/2013 | Sugisaki |
| 8,527,477 B2* | 9/2013 | Yamaguchi et al. ........... 707/694 |
| 2002/0162893 A1* | 11/2002 | Hikita .................. G06K 19/073 |
| | | 235/492 |
| 2002/0188830 A1 | 12/2002 | Boles et al. |
| 2003/0186724 A1* | 10/2003 | Tsutsumi et al. ............. 455/561 |
| 2005/0013218 A1* | 1/2005 | Lee ........................... G11B 5/78 |
| | | 369/47.21 |
| 2005/0157937 A1* | 7/2005 | Kondo .................... H04N 19/61 |
| | | 382/236 |
| 2005/0165923 A1 | 7/2005 | Miyake et al. |
| 2006/0063506 A1* | 3/2006 | Miwa ................. G06K 19/0723 |
| | | 455/333 |
| 2006/0131413 A1* | 6/2006 | Morita ................. G06K 7/0004 |
| | | 235/451 |
| 2006/0135142 A1 | 6/2006 | Repka |
| 2006/0187921 A1 | 8/2006 | Iwasaki |
| 2006/0200467 A1* | 9/2006 | Ohmori ................... G06F 21/32 |
| 2006/0234693 A1 | 10/2006 | Isidore et al. |
| 2007/0026844 A1* | 2/2007 | Watanabe ..................... 455/412.1 |
| 2007/0072622 A1 | 3/2007 | Ishibashi et al. |
| 2007/0095928 A1* | 5/2007 | Balinsky ................. G06F 21/35 |
| | | 235/492 |
| 2007/0150452 A1 | 6/2007 | Tsurumaki et al. |
| 2007/0184858 A1 | 8/2007 | Landschaft et al. |
| 2007/0253251 A1* | 11/2007 | Mizushima ............ G06K 19/07 |
| | | 365/185.04 |
| 2008/0022123 A1* | 1/2008 | Yoneda ................ G06Q 20/341 |
| | | 713/185 |
| 2008/0072072 A1 | 3/2008 | Muraki et al. |
| 2008/0079573 A1 | 4/2008 | Bloebaum et al. |
| 2008/0182618 A1* | 7/2008 | Gustavsson et al. ......... 455/557 |
| 2008/0205507 A1* | 8/2008 | Komiya et al. .......... 375/240.01 |
| 2008/0299907 A1* | 12/2008 | Takayama ............ H04B 5/0031 |
| | | 455/41.2 |
| 2009/0011747 A1* | 1/2009 | Wood et al. ................. 455/414.2 |
| 2009/0206984 A1* | 8/2009 | Charrat et al. ................. 340/5.2 |
| 2010/0149196 A1 | 6/2010 | Hattori et al. |

FOREIGN PATENT DOCUMENTS

| | | |
|---|---|---|
| JP | 2006-197482 | 7/2006 |
| JP | 2008-99236 | 4/2008 |
| WO | WO 2006/137286 A2 | 12/2006 |

* cited by examiner

FIG. 3

| DATA NAME | DATA TYPE | DATA LENGTH | STORAGE DESTINATION FLAG | DATA |

COMMUNICATION APPARATUS, PROGRAM, COMMUNICATION METHOD AND COMMUNICATION SYSTEM

CROSS-REFERENCE TO RELATED APPLICATIONS

The present application is a continuation application of and claims the benefit of priority under 35 U.S.C. §120 from U.S. application Ser. No. 13/733,514, filed Jan. 3, 2013, which is a continuation application of U.S. application Ser. No. 12/479,174, filed Jun. 5, 2009, now U.S. Pat. No. 8,374,544, and is based upon and claims the benefit of priority under 35 U.S.C. §119 from prior Japanese Patent Application No. 2008-195228, filed Jul. 29, 2008, the entire contents of each of which is incorporated herein by reference.

BACKGROUND OF THE INVENTION

Field of the Invention

The present invention relates to a communication apparatus, a program, a communication method and a communication system.

Description of the Related Art

In recent years, there has been broadly used a radio wave communication method prescribed in the IEEE (Institute of Electrical and Electronic Engineers) 802.11. In the radio wave communication method, wireless radio wave is transmitted and received by using an antenna, but the wireless radio wave interferes with a radio wave transmitted or received therearound, which may affect the communication.

There is proposed a short distance wireless communication method which uses electric field coupling or magnetic field coupling to make communication other than the radio wave communication method. In the short distance wireless communication method, for example, when a plurality of communication apparatuses for performing magnetic field coupling approach, the communication apparatuses magnetically couple so that a communication is realized between the communication apparatuses through magnetic field coupling. In this manner, according to the short distance wireless communication method utilizing electric field coupling or magnetic field coupling, since a signal is not transmitted if a communication party does not approach, an issue for the interference is difficult to occur, which is more advantageous than the radio wave communication method.

Actually, as described in Patent Document 1, for example, there is assumed that a plurality of communication methods are mounted on one communication apparatus. More specifically, a communication apparatus described in Japanese Patent Application Laid-Open No. 2002-291066 mounts thereon both a short distance communication function and a network communication function, stores therein predetermined data obtained by the network communication function outside the home, and transmits the same to a home apparatus by the short distance communication function inside the home.

SUMMARY OF THE INVENTION

However, the data obtained by the network communication function in a communication apparatus in related art and stored in the communication apparatus is not limited to the predetermined data to be transmitted by the short distance communication function. Thus, there is assumed that when the communication apparatus in related art approaches the home apparatus, after predetermined data is retrieved from the stored data, the predetermined data is transmittable. Therefore, the user needed to make the communication apparatus and the home apparatus approach each other for the search time and transmission time of the predetermined data.

The present invention has been made in views of the above issues, and it is desirable to provide a novel and improved communication apparatus, program, communication method and communication system capable of restricting a search time of data to be transmitted by a specific communication system.

According to an embodiment of the present invention, there is provided a communication apparatus including: a first storage unit; a second storage unit logically or physically discriminated from the first storage unit; a first communication unit; a second communication unit for transmitting data stored in the second storage unit through electric field coupling or magnetic field coupling; and a selecting unit for selecting at least either the first storage unit or the second storage unit as a storage destination of the data received by the first communication unit.

The selecting unit may select a storage destination of the data based on additional information of the data received by the first communication unit.

When information indicating a partial range of the data is contained in the additional information of the data received by the first communication unit, the selecting unit may select the second storage unit as a storage destination of the partial range of the data and selects the first storage unit as a storage destination of the data.

The data stored in the first storage unit may be restricted from transmitting from the second communication unit.

According to another embodiment of the present invention, there is provided a program for causing a computer to function as: a first storage unit; a second storage unit logically or physically discriminated from the first storage unit; a first communication unit; a second communication unit for transmitting data stored in the second storage unit through electric field coupling or magnetic field coupling; and a selecting unit for selecting at least either the first storage unit or the second storage unit as a storage destination of the data received by the first communication unit.

According to another embodiment of the present invention, there is provided a communication method including the steps of: receiving data in an arbitrary communication method; selecting at least either a first storage unit or a second storage unit logically or physically discriminated from the first storage unit as a storage destination of the data received by the arbitrary communication method; storing the data in a selected storage destination; and transmitting the data stored in the second storage unit through electric field coupling or magnetic field coupling.

According to another embodiment of the present invention, there is provided a communication system including: a first communication apparatus for making communication through electric field coupling or magnetic field coupling; and a second communication apparatus including, a first storage unit, a second storage unit logically or physically discriminated from the first storage unit, a first communication unit, a second communication unit for transmitting data stored in the second storage unit to the first communication apparatus through electric field coupling or magnetic field coupling, and a selecting unit for selecting at least either the first storage unit or the second storage unit as a storage destination of the data received by the first communication unit.

According to the embodiments of the present invention described above, it is possible to restrict a search time of data to be transmitted by a specific communication system.

BRIEF DESCRIPTION OF THE DRAWINGS

FIG. 3 is an explanatory diagram showing a structure example of additional information added to content data;

DETAILED DESCRIPTION OF THE PREFERRED EMBODIMENTS

Figure 1:
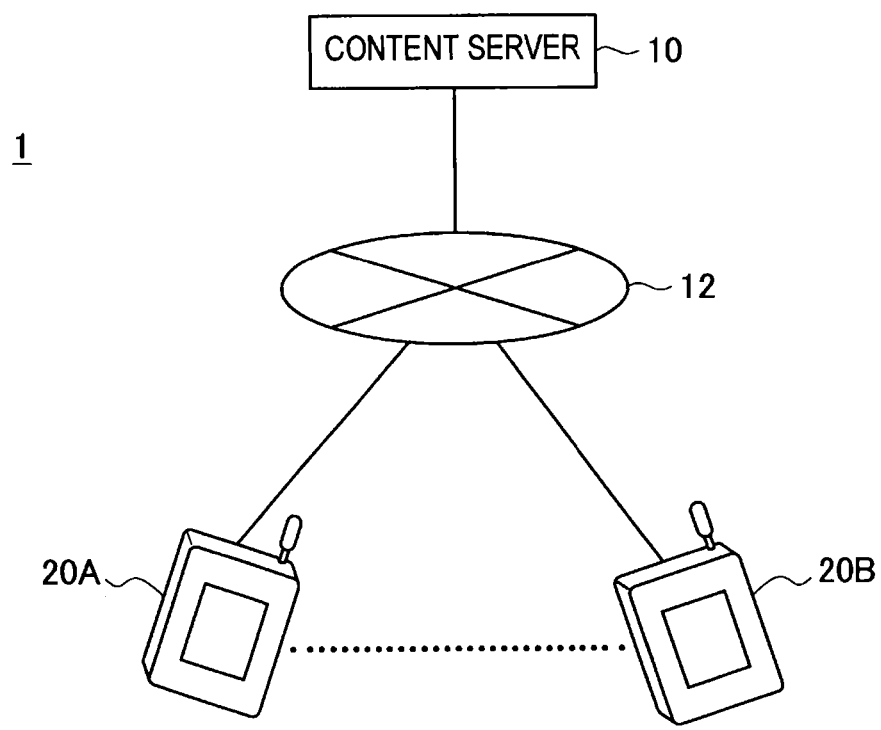
FIG. 1 is an explanatory diagram showing a structure of a communication system according to the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

"DETAILED DESCRIPTION OF THE PREFERRED EMBODIMENTS" will be described according to the following items:

(1) Entire structure of the present embodiment
(2) Structure of cell phone according to the present embodiment
(3) Operation of cell phone according to the present embodiment
(4) Conclusion (1) Entire Structure Of The Present Embodiment At first, the entire structure of a communication system 1 according to the present embodiment will be described with reference to FIG. 1.

FIG. 1 is an explanatory diagram showing the structure of the communication system 1 according to the present embodiment. As shown in FIG. 1, the communication system 1 includes a content server 10, a network 12 and cell phones 20A and 20B.

In the present specification, each of the constituents having substantially the same function is discriminated by adding different alphabets to the same reference numeral. However, when each of the constituents having the same function does not need to be discriminated, only the reference numeral is denoted. For example, when the cell phone 20A and the cell phone 20B does not need to be discriminated from each other, they are simply denoted as cell phone 20.

The content server 10 is connected to the cell phones 20 via the network 12. The content server 10 stores therein content data, and transmits the content data to the cell phones 20 in response to a request from the cell phones 20, for example. The content data may be any data including music data such as music, lecture and radio program, video data such as cinema, TV program, video program, photographs, documents, pictures and graphics, or games and software.

The network 12 is a wired or wireless transmission path for information transmitted from an apparatus connected to the network 12. For example, the network 12 may include public line network such as Internet, telephone line network or satellite communication network, or dedicated line network such as various LAN (Local Area Network) including Ethernet (registered trademark), WAN (Wide Area Network) or IP-VPN (Internet Protocol-Virtual Private Network).

The cell phones 20A and 20B are a communication apparatus which is communicable to the content server 10 via the network 12. For example, the cell phone 20A and 20B can store therein, reproduce or transfer the content data received from the content server 10.

Further, cell phones 20A and 20B include an electrode plate which is referred to as electric field coupler capable of electric field coupling with each other. When the electric field coupler of both cell phones 20A and 20B approach within 3 cm, for example, a change in inductive field occurring by one electric field coupler is sensed by the other electric field coupler so that electric field communication is realized between the cell phones 20A and 20B.

Specifically, in a pair of devices for making the above electric field communication, one of the pair functions as an initiator and the other functions as a responder. The initiator is directed for making a connection establishment request and the responder is directed for receiving the connection establishment request from the initiator.

For example, when the cell phone 20B shown in FIG. 1 functions as an initiator and the cell phone 20A functions as a responder, if the cell phones 20A and 20B approach each other, the cell phone 20A receives a connection establishment request transmitted from the cell phone 20B. Then, when the connection establishment request is received by the cell phone 20A, the cell phones 20A and 20B perform an authentication processing as one example of the connection establishment processing, and when the authentication processing is normally ended, the cell phones 20A and 20B are connected to a state where data communication is possible.

The authentication processing includes, for example, confirmation as to whether software versions or emulation systems indicating protocol are coincided between the cell phones 20A and 20B.

Thereafter, the cell phones 20A and 20B make data communication in one-to-one. Though described later in detail, for example, the cell phone 20A transmits the content data stored in an incorporated dedicated memory from an electric field coupler to the cell phone 20B.

Since a radio wave emitted from an antenna attenuates in reverse proportion to the square of the distance and the intensity of the inductive field occurring from the electric field coupler is reversely proportional to the fourth power of the distance, the distance between a pair of cell phones 20 capable of electric field communication can be advantageously restricted. In other words, there can be obtained effects that deterioration in a signal due to surrounding obstacle is less in the field communication and a technique for preventing hacking or securing confidential can be simplified.

A radio wave emitted from an antenna has a transverse wave component oscillating in a direction orthogonal to the wave traveling direction and a polarized wave is present therein. To the contrary, since the electric field coupler generates an inductive field having a longitudinal wave component oscillating in the traveling direction and having no polarized wave, if the faces of the pair of electric field couplers are opposed to each other, a signal can be conveniently received at the reception side.

In the present specification, there will be described an example in which a pair of cell phones 20 utilizes an electric field coupler to make a short distance wireless communication (non-contact communication), but the present invention is not limited to the example. For example, a pair of cell phones 20 can also make short distance wireless communication via a communication unit capable of communication through magnetic field coupling. Further, the cell phones 20A and 20B can make telephone communication or e-mail communication.

Further, the cell phones 20A and 20B are merely shown as one example of the communication apparatus in FIG. 1, and the present invention is not limited to the example. For example, the communication apparatus may be an information processing device such as PC (personal computer), home video processing device (such as DVD recorder or video cassette recorder), cell phone, PHS (personal handyphone system), portable music player, portable video processing device, PDA (personal digital assistants), home game device, portable game device or household electrical appliance.

(2) Structure Of Cell Phone According To The Present Embodiment

A structure of the cell phone 20 included in the communication system 1 will be described with reference to FIGS. 2 to 4.

Figure 2:
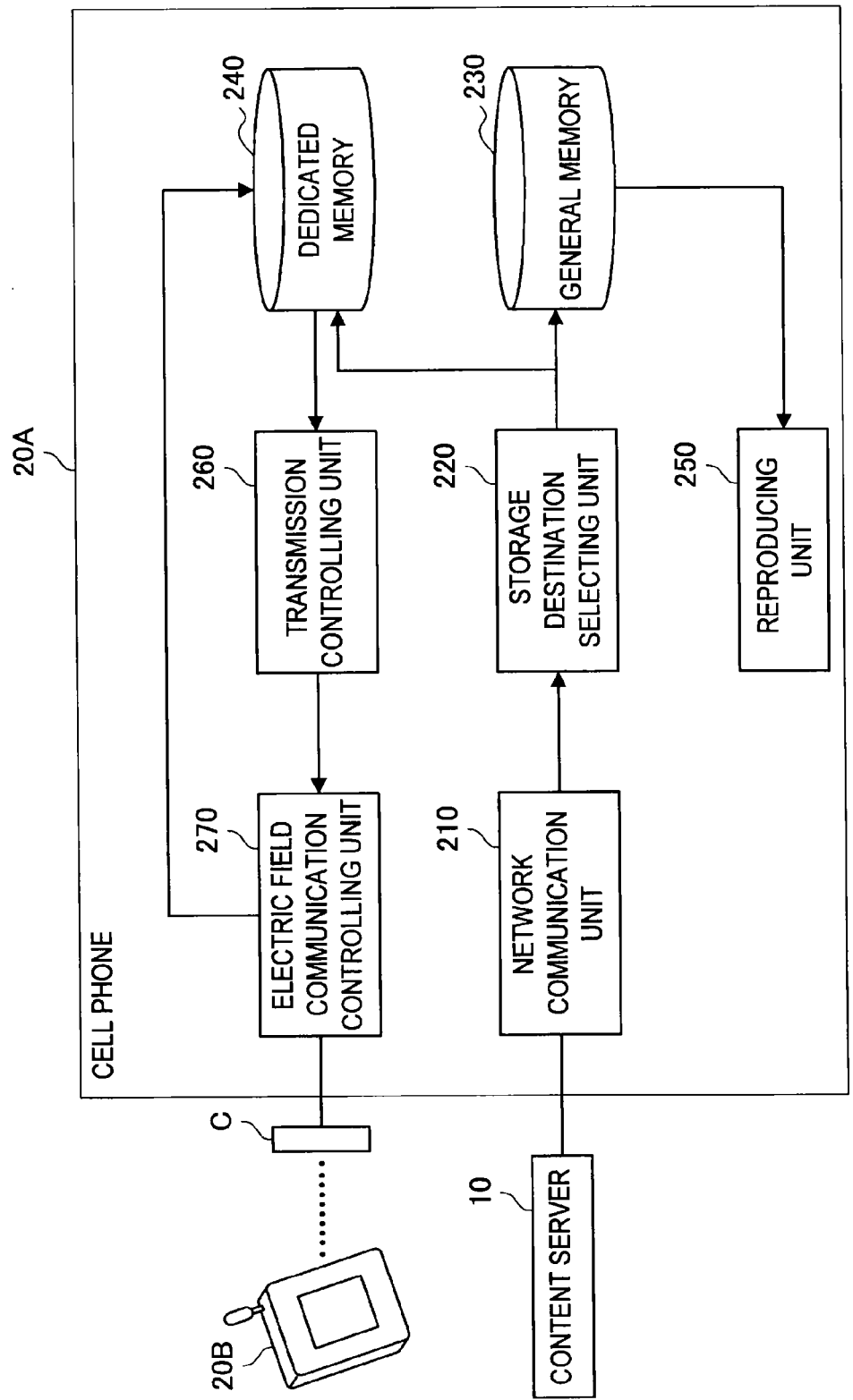
FIG. 2 is a functional block diagram showing a structure of a cell phone according to the present embodiment.

FIG. 2 is a functional block diagram showing the structure of the cell phone 20A according to the present embodiment. As shown in FIG. 2, the cell phone 20A includes an electric field coupler C, a network communication unit 210, a storage destination selecting unit 220, a general memory 230, a dedicated memory 240, a reproducing unit 250, a transmission controlling unit 260 and an electric field communication controlling unit 270.

The network communication unit 210 (first communication unit) makes communication with the content server 10 via the network 12. Specifically, the network communication unit 210 may have a wireless communication function defined in the IEEE (Institute of Electrical and Electronic Engineers) 802.11a, b, g and the like, or a MIMO (Multiple Input Multiple Output) communication function defined in the IEEE 802.11n. Further, the network communication unit 210 may have a communication function corresponding to WiMAX (Worldwide Interoperability for Microwave Access) defined in the IEEE 802.16 or a communication function corresponding to a wired LAN defined in the IEEE 802.3.

The network communication unit 210 may make a content data transmission request to the content server 10 based on a user's operation, and receive the content data transmitted from the content server 10 in response to the transmission request.

The cell phone 20 may have a structure for making communication other than the electric field communication in addition to the structure for making the electric field communication, and FIG. 2 merely shows the network communication unit 210 as one example of the structure for making communication other than the electric field communication.

The storage destination selecting unit 220 has a function as a selecting unit for selecting a storage destination of the content data received from the content server 10 by the network communication unit 210. Hereinafter, a selection of the storage destination by the storage destination selecting unit 220 will be described with reference to FIGS. 2 and 3.

FIG. 3 is an explanatory diagram showing a structure example of additional information added to the content data. As shown in FIG. 3, the content data transmitted from the content server 10 contains a data name, a data type, a data length, a storage destination flag and the like, for example.

The storage destination selecting unit 220 selects whether to store the content data added with the additional information in the dedicated memory 240 based on the storage destination flag contained in the additional information. For example, when the bit value of the storage destination flag is "1", the storage destination selecting unit 220 may select both the general memory 230 and the dedicated memory 240 as the storage destination of the content data. On the other hand, when the bit value of the storage destination flag is "0", the storage destination selecting unit 220 may select only the general memory 230 as the storage destination of the content data.

With the structure, when eight items of photograph data are received from the content server 10, for example, only two items of photograph data may be stored in the dedicated memory 240 and all the eight items may be stored in the general memory 230.

Figure 4:
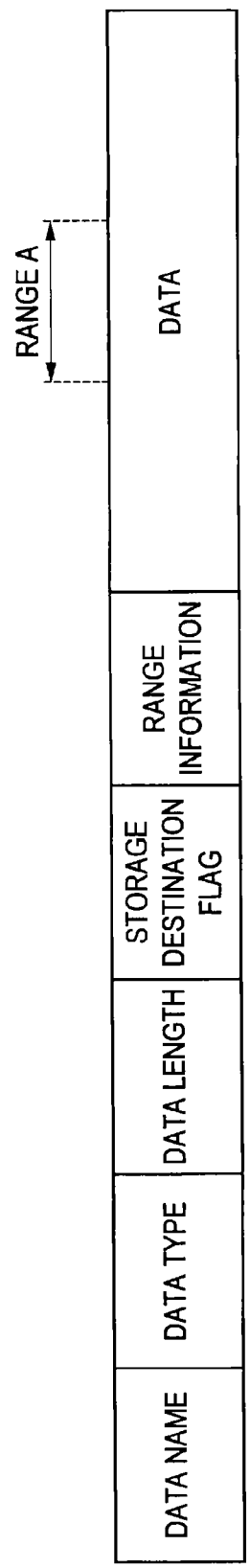
FIG. 4 is an explanatory diagram showing another structure example of the additional information added to the content data.

FIG. 4 is an explanatory diagram showing another structure example of the additional information added to the content data. In the example shown in FIG. 4, the content data transmitted from the content server 10 contains a data name, a data type, a data length, a storage destination flag and range information.

The storage destination selecting unit 220 stores part of the content data added with the addition information in the dedicated memory 240 based on the range information contained in the additional information. For example, when the range information indicates the range A out of the content data as shown in FIG. 4, the storage destination selecting unit 220 may select the dedicated memory 240 as the storage destination of the data portion of the range A. Further, the storage destination selecting unit 220 may select the general memory 230 as the storage destination of the entire content data.

With the structure, when the content data on a certain track is received from the content server 10, for example, a main part of the track (main melody line of the track) can be stored in the dedicated memory 240 and the entire content data including the main melody part can be stored in the general memory 230. Alternatively, when one item of photograph data is received from the content server 10, only the faces of photographic subjects contained in the photograph data can be stored in the dedicated memory 240 and the entire photograph data containing the faces of the photographic subjects can be stored in the general memory 230.

Returning to the explanation of the structure of the cell phone 20A with reference to FIG. 2, the general memory 230 (first storage unit) and the dedicated memory 240 (second storage unit) stores, when being selected as the storage destinations of certain data by the storage destination selecting unit 220, the certain data.

FIG. 2 shows how the general memory 230 and the dedicated memory 240 are physically separated, but the present embodiment is not limited to the example. For example, the general memory 230 and the dedicated memory 240 may be configured to be logically separated in the same storage medium.

Further, the dedicated memory 240 may store the content data received by the electric field coupler C and the general memory 230 may not store the content data received by the electric field coupler C.

The general memory 230 and the dedicated memory 240 described above may be a storage medium such as non-volatile memory, magnetic disk, optical disk and MO (Magneto Optical) disk. The non-volatile memory includes EEPROM (Electrically Erasable Programmable Read-Only Memory) and EPROM (Erasable Programmable ROM). Further, the Magnetic disk includes a hard disk and a disc-shaped magnetic disk. The optical disk includes CD (Compact Disc), DVD-R (Digital Versatile Disc Recordable), BD (Blu-Ray Disc (registered trademark)) and the like.

The reproducing unit 250 reproduces the content data stored in the general memory 230. Specifically, the reproducing unit 250 decodes and outputs the content data in a user recognizable form such as air vibration or video. Since only part of the content data is stored in the dedicated memory 240 while the entire content data is stored in the general memory 230, the reproducing unit 250 can perform typical reproduction.

The electric field coupler C functions as the communication unit (second communication unit) for making communication with an electric field coupler of the approached communication apparatus (such as the cell phone 20B) through electric field coupling as described in "[1] Entire structure of the present embodiment".

The electric field communication controlling unit 270 controls the entire electric field communication between the electric field coupler C and the cell phone 20B. For example, the electric field communication controlling unit 270 generates and converts connection data for the connection establishment processing into a signal transmittable from the electric field coupler C. Further, the electric field communication controlling unit 270 converts the data supplied from the transmission controlling unit 260 into a signal transmittable from the electric field coupler C.

Further, the electric field communication controlling unit 270 decodes the data received by the electric field coupler C. For example, the electric field communication controlling unit 270 may down-convert the data received by the electric field coupler C as a high frequency signal into a baseband signal to obtain a bit string based on the constellation.

When the electric field coupler C and the cell phone 20B approach each other, the transmission controlling unit 260 reads out the content data stored in the dedicated memory 240 as the data to be transmitted and supplies the same to the electric field communication controlling unit 270. Thus, when the electric field coupler C and the cell phone 20B approach each other, the content data stored in the dedicated memory 240 is transmitted from the electric field coupler C to the cell phone 20B. The transmission controlling unit 260 may restrict the transmission of the content data stored in the general memory 230 from the electric field coupler C. For example, the transmission controlling unit 260 may entirely prohibit the transmission of the content data stored in the general memory 230 from the electric field coupler C. Alternatively, the transmission controlling unit 260 may restrict the transmission of the content data stored in the general memory 230 from the electric field coupler C within the predetermined number of times (which may be set previously or for each content data). Alternatively, the transmission controlling unit 260 may transmit the content data stored in the general memory 230 from the electric field coupler C only when predetermined authentication information (such as password) is input by the user. The cell phone 20B may store the content data received from the electric field coupler C of the cell phone 20A in the dedicated memory 240 of the cell phone 20B and transmit the content data stored in the dedicated memory 240 through electric field communication when approaching other communication apparatus.

With the structure, the transmission controlling unit 260 can primarily (preferentially) read out the content data stored in the dedicated memory 240 as the data to be transmitted. If the content data is managed in a single memory, it takes some time to search for the content data to be transmitted but the search time can be reduced according to the present embodiment. Further, the content server 10 can set the storage destination flag contained in the additional information to control whether the content data after the transmission can be transferred through electric field communication.

(3) Operation Of Cell Phone According To The Present Embodiment

The structure of the cell phone 20 according to the present embodiment has been described above with reference to FIGS. 2 to 4. Subsequently, an operation of the cell phone 20 according to the present embodiment will be describe with reference to FIG. 5.

Figure 5:
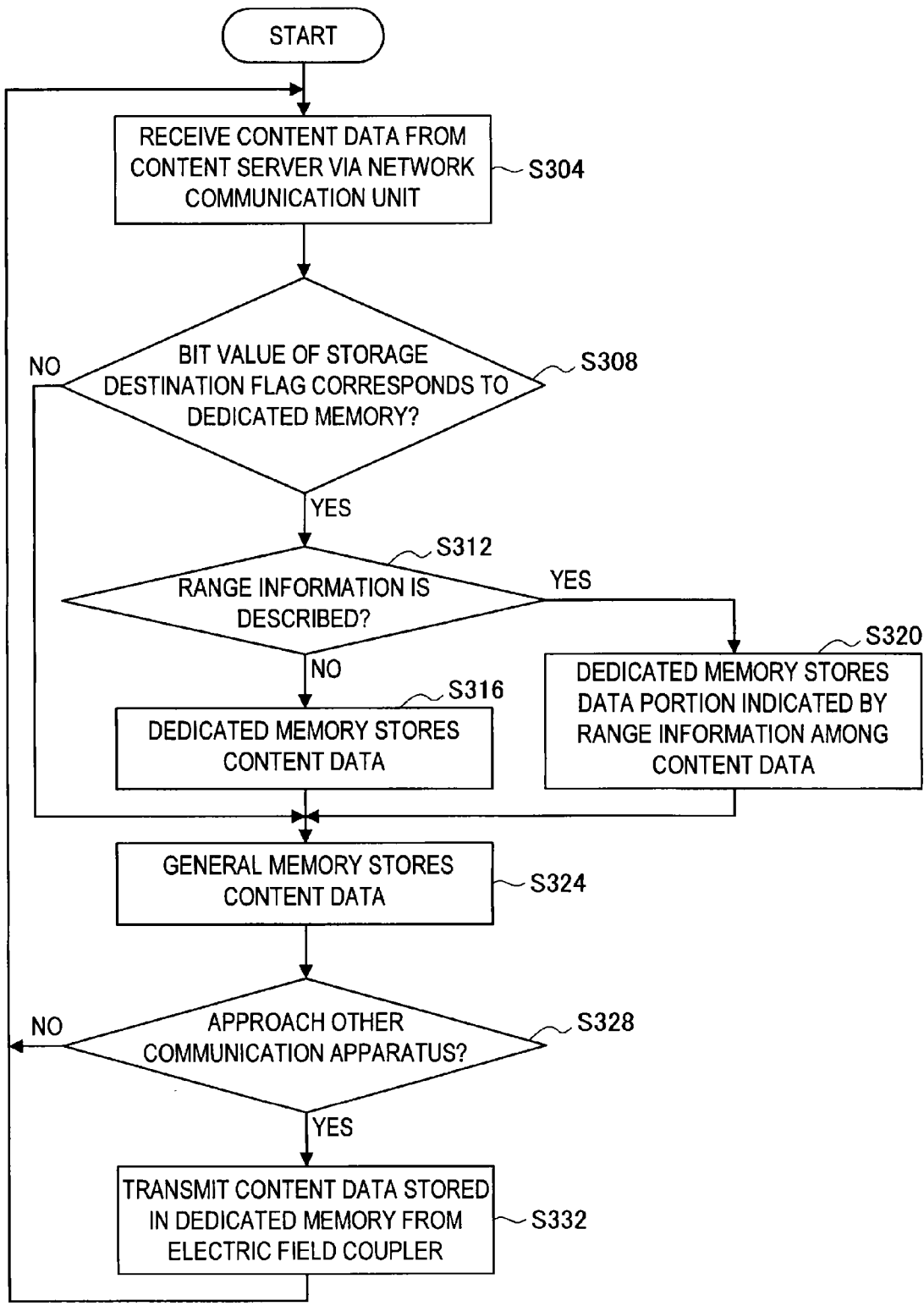
FIG. 5 is a flowchart showing a flow of an operation of the cell phone according to the present embodiment.

FIG. 5 is a flowchart showing a flow of the operation of the cell phone 20 according to the present embodiment. As shown in FIG. 5, at first, when the network communication unit 210 receives the content data from the content server 10 (S304), the storage destination selecting unit 220 confirms the storage destination flag contained in the additional information added to the content data. Then, when the bit value of the storage destination flag corresponds to the dedicated memory 240 (S308) and the range information is described therein (S312), the storage destination selecting unit 220 selects the dedicated memory 240 as the storage destination of the data portion indicated by the range information out of the content data (S320). Thus, the dedicated memory 240 stores therein the data portion indicated by the range information out of the content data.

On the other hand, when the bit value of the storage destination flag corresponds to the dedicated memory 240 (S308) and the range information is not described therein (S312), the storage destination selecting unit 220 selects the dedicated memory 240 as the storage destination of the content data (S316). Thus, the dedicated memory 240 stores therein the content data.

Further, also when the bit value of the storage destination flag does not correspond to the dedicated memory 240 (S308), the storage destination selecting unit 220 selects the general memory 230 as the storage destination of the content data (S324). Thus, the general memory 230 stores therein the content data.

Thereafter, the electric field communication controlling unit 270 detects an approach between the electric field coupler C of the cell phone 20 and other communication apparatus. Specifically, the electric field communication controlling unit 270 repeatedly transmits a connection establishment request (C-Req) from the electric field coupler C until other communication apparatus approaches thereto. Then, when the electric field coupler C of the cell phone 20 approaches other communication apparatus and the other communication apparatus receives the connection establishment request transmitted from the electric field coupler C of the cell phone 20, the other communication apparatus transmits a response (C-ACC) to the connection establishment request.

Further, the electric field communication controlling unit 270 of the cell phone 20 transmits a confirmation signal (C-Ack) to the response (C-ACC)from the electric field coupler C so that a connection is established between the cell phone 20 and the other communication apparatus. Here, the electric field communication controlling unit 270 can detect the approach to the other communication apparatus in reception to the response (C-ACC) from the other communication apparatus. There has been described the example in which the cell phone 20 functions as an initiator, but when the cell phone 20 functions as a responder, an approach to other communication apparatus may be detected in reception to the connection establishment request (C-Req).

When the approach between the electric field coupler C of the cell phone 20 and the other communication apparatus is detected in this manner (S328), the transmission controlling unit 260 reads out and supplies the content data stored in the dedicated memory 240 to the electric field communication controlling unit 270. Then, the electric field communication controlling unit 270 transmits the content data supplied from the transmission controlling unit 260 from the electric field coupler C to other communication apparatus (S332).

(4) Conclusion

As described above, when the electric field coupler C and the other communication apparatus approach each other, the transmission controlling unit 260 primarily (preferentially) reads out the content data stored in the dedicated memory 240, and the electric field communication controlling unit 270 transmits the content data from the electric field coupler C. In the present embodiment described above, a time to search for the content data to be transmitted through electric field communication is restricted, thereby reducing an approach time between the electric field coupler C and other communication apparatus.

According to the present embodiment, for example, a main melody part in music data can be easily shared with many users in the electric field communication. Some users who like the main melody part of the music among the users who listened to it can be expected to purchase the entire music data.

The content server 10 sets the storage destination flag contained in the additional information, thereby controlling whether the content data can be transferred through electric field communication. If the content server 10 previously describes the address information for accessing the content data in the additional information, the user who has indirectly received the content data can easily obtain content data relating to the content data.

It should be understood by those skilled in the art that various modifications, combinations, sub-combinations and alterations may occur depending on design requirements and other factors insofar as they are within the scope of the appended claims or the equivalents thereof.

There has been mainly described the example in which only the content data stored in the dedicated memory 240 is to be transmitted, but the present invention is not limited to the example. For example, the transmission controlling unit 260 may transmit the content data selected by the user out of the content data stored in the general memory 230.

Each step in the processing of the cell phone 20 in the present specification does not necessarily need to be processed in time lime in the order described in the flowchart. For example, each step in the processing of the cell phone 20 may include a processing performed in parallel or individually (such as parallel processing or object processing).

Further, there can be created a computer program for causing hardware such as CPU, ROM and RAM incorporated in the cell phone 20 to exhibit similar function as each structure of the cell phone 20 described above. A storage medium in which the computer program is stored is also provided. The respective functional blocks illustrated in the functional block diagram of FIG. 2 are configured in hardware, thereby realizing a series of processings in hardware.

What is claimed is:

1. An apparatus comprising:
circuitry configured to
receive first data;
transmit second data through electric field coupling or magnetic field coupling from a data source selected from amongst a plurality of data sources including logically or physically discriminated first and second memory circuits;
determine whether transmission from the first memory circuit is to be prohibited; and
control selection of the data source of the second data to be transmitted from amongst the plurality of data sources to select one of the plurality of data sources other than the first memory circuit as the data source in a situation in which the transmission from the first memory circuit is to be prohibited.

2. The apparatus according to claim 1, further comprising: the plurality of data sources.

3. The apparatus according to claim 1, wherein the circuitry is further configured to control selection of a storage destination of at least a part of the first data from amongst the plurality of data sources.

4. The apparatus according to claim 3, wherein the circuitry is further configured to control the selection of the storage destination based on additional information of the first data from amongst the plurality of data sources.

5. The apparatus according to claim 4, wherein when information indicating a partial range of the first data is included in the additional information of the first data, the circuitry is configured to select one of the data sources other than the first memory circuit as the storage destination of the partial range of the first data and is configured to select the first memory circuit as the storage destination of all of the first data.

6. The apparatus according to claim 5, wherein the circuitry is further configured to restrict the first data stored in the first memory circuit from being transmitted.

7. A method, comprising:
receiving, by circuitry, first data;
transmitting, by the circuitry, second data through electric field coupling or magnetic field coupling from a data source selected from amongst a plurality of data sources including logically or physically discriminated first and second memory circuits;
determining, by the circuitry, whether transmission from the first memory circuit is to be prohibited; and
controlling, by the circuitry, a selection of the data source of the second data to be transmitted from amongst the plurality of data sources to select one of the plurality of data sources other than the first memory circuit as the data source in a situation in which the transmission from the first memory circuit is to be prohibited.

8. A non-transitory computer readable medium including executable instructions, which when executed by circuitry, causes the circuitry to perform the method according to claim 7.

9. A server comprising:
circuitry configured to transmit first data with additional information to a communication apparatus, wherein
the additional information includes information that is determinative of a memory storage area of the communication apparatus, such that the communication apparatus is configured to select a storage destination of the first data from amongst a plurality of data sources including logically or physically discriminated first and second memory circuits based on the additional information, and such that the re-transmission of at least a part of the first data, from the communication apparatus to an external apparatus, is restricted to electric field coupling or magnetic field coupling and is further restricted to determine whether transmission from the first memory circuit is to be prohibited and to select one of the plurality of data sources other than the first memory circuit as a data source for the retransmission in a situation in which the transmission from the first memory circuit is to be prohibited.

10. A method comprising:

transmitting, by circuitry of a server, first data with additional information to a communication apparatus, wherein the additional information includes information that is determinative of a memory storage area of the communication apparatus, such that the communication apparatus is configured to select a storage destination of the first data from amongst a plurality of data sources including logically or physically discriminated first and second memory circuits based on the additional information, and such that the re-transmission of at least a part of the first data, from the communication apparatus to an external apparatus, is restricted to electric field coupling or magnetic field coupling and is further restricted to determine whether transmission from the first memory circuit is to be prohibited and to select one of the plurality of data sources other than the first memory circuit as a data source for the retransmission in a situation in which the transmission from the first memory circuit is to be prohibited.

11. A non-transitory computer readable medium including executable instructions, which when executed by circuitry, causes the circuit to perform the method according to claim 10.

12. A system, comprising:

a communication apparatus including circuitry configured to receive first data;

transmit second data through electric field coupling or magnetic field coupling from a data source selected from amongst a plurality of data sources including logically or physically discriminated first and second memory circuits;

determine whether transmission from the first memory circuit is to be prohibited; and control selection of the data source of the second data to be transmitted from amongst the plurality of data sources to select one of the plurality of data sources other than the first memory circuit as the data source in a situation in which the transmission from the first memory circuit is to be prohibited, and a server including circuitry configured to transmit the first data with additional information to the communication apparatus, wherein the communication apparatus is configured to select a storage destination of the first data from amongst the logically or physically discriminated first and second memory circuits based on the additional information.

* * * * *